(12) United States Patent
Goldhamer (10) Patent No.: US 10,166,917 B2
(45) Date of Patent: Jan. 1, 2019

(54) TRANSMISSION OF UNCOMPRESSED VIDEO IN CELLULAR NETWORKS

(71) Applicant: Mariana Goldhamer, Ramat Gan (IL)

(72) Inventor: Mariana Goldhamer, Ramat Gan (IL)

(*) Notice: Subject to any disclaimer, the term of this patent is extended or adjusted under 35 U.S.C. 154(b) by 434 days.

(21) Appl. No.: 14/838,484

(22) Filed: Aug. 28, 2015

(65) Prior Publication Data

US 2016/0066357 A1 Mar. 3, 2016

Related U.S. Application Data

(60) Provisional application No. 62/044,215, filed on Aug. 30, 2014.

(51) Int. Cl.
*B60Q 9/00* (2006.01)
*H04W 4/80* (2018.01)
*H04W 16/14* (2009.01)
*B60W 30/18* (2012.01)
*H04W 68/00* (2009.01)
*H04W 76/15* (2018.01)

(52) U.S. Cl.
CPC ............ *B60Q 9/00* (2013.01); *B60W 30/18* (2013.01); *H04W 4/80* (2018.02); *H04W 16/14* (2013.01); *H04W 68/00* (2013.01); *H04W 76/15* (2018.02)

(58) Field of Classification Search
CPC ........ B60Q 9/00; H04W 4/008; H04W 68/00; H04W 16/14; H04W 76/025; H04W 76/15; B60W 30/18
See application file for complete search history.

(56) References Cited

U.S. PATENT DOCUMENTS

| 7,274,740 B2 | 9/2007 | van Beek et al. |
| 8,239,900 B1 | 8/2012 | Sun |
| 8,254,441 B2 | 8/2012 | Sun |
| 8,363,675 B2 | 1/2013 | Singh et al. |
| 8,677,438 B2 | 3/2014 | Kabuto |

(Continued)

FOREIGN PATENT DOCUMENTS

WO WO/2014/067573 A1 5/2014

OTHER PUBLICATIONS

Uncompressed video, Wikipedia, retrieved Aug. 7, 2014.

(Continued)

*Primary Examiner* — Joseph Dean, Jr.

(57) ABSTRACT

A method and apparatus are described, for providing short-range uncompressed video service in a cellular network. The method comprises the steps of: establishing a communication link between at least one local sensor to a base station or to a first user equipment (UE), by using a non-cellular technology; establishing a radio communication channel by using a cellular technology between at least one second user equipment (UE) and the base station or between at least one second UE and the first UE by using a device-to-device (D2D) cellular technology; transmitting over the radio communication channel, uncompressed video data representing at least one area of the video image that was received from the at least one local sensor or control information resulting from processing the received data; and providing the received data or the control information to at least one mobile application residing at the at least one second UE or to at least one control element associated with the at least one second UE.

22 Claims, 6 Drawing Sheets

(56) References Cited

U.S. PATENT DOCUMENTS

| | | | |
|---|---|---|---|
| 8,745,673 B2 | 6/2014 | Sato et al. | |
| 2014/0341039 A1* | 11/2014 | Rubin | H04W 28/0231 |
| | | | 370/235 |
| 2015/0163210 A1* | 6/2015 | Meyers | H04W 4/70 |
| | | | 726/4 |

OTHER PUBLICATIONS

3GPP TS 36.413 V12.2.0 (Jun. 2014).
3GPP TS 36.423 V12.2.0 (Jun. 2014).
3GPP TS 36.211 V12.2.0 (Jun. 2014).
3GPP TS 36.306 V12.1.0 (Jun. 2014).

* cited by examiner

FIG. 6

TRANSMISSION OF UNCOMPRESSED VIDEO IN CELLULAR NETWORKS

FIELD OF THE INVENTION

The invention relates generally to digital communication systems and in particular to cellular systems distributing information over radio to user equipment.

BACKGROUND OF THE INVENTION

Wireless access networks, including cellular networks, are designed for providing user connectivity with the Internet or with multimedia servers. The Internet is considered to be the main source of information for mobile users.

Cellular base stations will become more service oriented, some of them already providing cashing services for video streamed by the network. Adding services to base stations is perceived as an IaaS (Infrastructure as a Service) approach, providing additional revenues for the cellular operators.

Video streaming is an example of multimedia services. Due to capacity limitations of the transport network, the video is compressed in compliance with International Standards, for example MPEG-2 or MPEG-4. There are two main aspects of a compressed video image, which have adverse effects on a possible implementation:

1. Quality, the image being slightly distorted due to compression;
2. Latency, resulting from the relatively long time required for compression and decompression (only the compression step may take 500 ms).

The CEA-861 and the HDMI (High Definition Media Interface) standards define video frame formats for uncompressed high definition video, wherein the data rates required for uncompressed image transmission vary between 0.5 Gb/s and 3 Gb/s. The wireless video transmission at such high data rates is possible by using either 802.11, LTE or proprietary solutions. With few exceptions, the users of such systems are fixed and indoor located. The few cases in which the users are mobile, outdoor located, involve industrial applications, but these do not use yet the cellular technology.

For each pixel a color code may be transmitted according to standard formats (e.g. RGB, YCbCr, etc.). The color code includes the number of bits used for each color or luma (brightness) component.

The mobile service enables "applications", running on the mobile phone. The modern cellular systems, like LTE, provide support for broadcast compressed video, the related functionality being known as MBSFN (Multi Media Broadcast Single Frequency Network), targeting the video service via a multitude of base stations which operate in a synchronized mode and transmit the compressed video image. "Video over IP", is another video streaming service, which is in fact a data service, using also compressed video.

SUMMARY OF THE INVENTION

The disclosure may be summarized by referring to the appended claims.

It is an object of the present invention to provide a method and device to enable transmitting data from a sensor (e.g. a video camera) located in the vicinity of a UE (user equipment) or of a base station, data that may be forwarded to other UEs.

It is another object of the present invention to provide a method and device to enable providing information to drivers whose field of view is currently obstructed.

Other objects of the present invention will become apparent from the following description.

According to a first embodiment of the invention, a method is provided for use in a cellular system, which comprises the steps of:

establishing a communication link between at least one local video sensor to a base station or to a first user equipment (UE), by using a non-cellular technology;

establishing a radio communication channel by using a cellular technology between at least one second user equipment (UE) and the base station or between at least one second UE and the first UE by using a device-to-device (D2D) cellular technology;

transmitting over the radio communication channel at least one of the following: uncompressed video data representing at least one area of at least one video image that was received from the at least one local video sensor or control information resulting from processing the received video image; and providing to at least one mobile application residing at the at least one second UE or to at least one control element associated with the at least one second UE at least one of the following: the received uncompressed video data representing at least one area of at least one video image or the control information or any combination thereof.

This method may be used for example for providing short-range services in the cellular system.

The term "local sensor" or "local video sensor" as used herein throughout the specification and claims refers to a sensor (or a video sensor as the case may be) located at the geographical vicinity of a UE or a base station.

The term "device-to-device (D2D)" as used herein throughout the specification and claims refers to direct communications using cellular technology between nearby mobile devices. It facilitates the interoperability between critical public safety networks and global commercial networks based on e.g. LTE.

According to another embodiment, at least one of the following: a local video sensor or the at least one control element is identified by at least one member of a group that consists of: a cellular SIM, an Ethernet address or a product identification number.

In accordance with another embodiment, the at least one local sensor is a video camera transmitting at least one uncompressed area of at least one video image.

By yet another embodiment, transmitting the at least one uncompressed area of the video image includes processing of the video image for adapting the transmitted data rate to at least one of the following: time-frequency resource or modulation and coding rate, assigned for transmission over the radio communication channel.

According to still another embodiment, the at least one video image or a command derived from data comprised in the at least one video image, is used by a robot or by a control element embedded in a vehicle.

In accordance with another embodiment, the at least one video image is displayed on a user equipment located within a vehicle, and wherein the at least one video image being displayed, presents a current view of a road along which the vehicle is driving or is about to drive.

According to another embodiment, the control element is configured to carry out at least one of the following actions: to activate an alert, to control the movement of the vehicle and to send a message to a third party, e.g. the police or other first responders.

By still another embodiment, the video camera is used in the provisioning health services.

In accordance with still another embodiment, a code representing at least one of the short-range services is broadcasted by the base station or by the first UE.

According to another embodiment, the code representing the type of at least one of the short-range services is stored at a database together with information that allows identifying radio cells and base station through which that type of at least one of the short-range services may be provided.

According to yet another embodiment, the database further includes location information of a base station through which that type of at least one of the short-range services may be provided, for allowing a fast handover of the second UE to a different base station or a UE served by a different base station, through which the type of at least one of the short-services, may be provided.

By still another embodiment, at least one of the short-range services is provided by a specific network operator.

In accordance with another embodiment, the radio communication includes carrier aggregation.

According to yet another embodiment, at least one carrier in un-licensed or light licensed spectrum, is utilized in the radio communication channel.

According to another aspect of the invention, there is provided a user equipment (UE) apparatus for use in a cellular system, which comprises:

a first interface, configured to enable establishing a communication link between at least one local video sensor and said UE, by using a non-cellular technology;

a second interface, configured to enable establishing a radio communication channel between said UE and at least one other user equipment (UE), by using a D2D cellular technology;

a receiver configured to receive uncompressed video data from the at least one local video sensor; and a transmitter configured to transmit over the radio communication channel to the at least one other UE at least one member of a group that consists of: uncompressed video data representing at least one area of at least one video image received from the at least one local video sensor or control data retrieved after having processed the at least one received video image.

According to yet another embodiment, the UE apparatus further comprise at least one processing block configured to process the at least one area of the at least one video image received from the at least one local video sensor, for adapting the transmitted data rate at which the data will be transmitted by the transmitter, according to at least one of the following: time-frequency resource or modulation and coding rate, as assigned for transmitting the data over the radio communication channel.

In accordance with another embodiment, the data received from the at least one local sensor comprises at least one video image adapted to be displayed on the at least one other UE located within a vehicle, and wherein the at least one video image presents a current view of a road along which the vehicle, in which one of the at least one other UE is installed, is driving or is about to drive.

By still another embodiment, the at least one processor is configured to process data received from the at least one local sensor, and to determine based on the processed data whether a control instruction should be sent to the at least one other user. For example, such a control instruction may relate to at least one of the following actions: to activate an alert, to control the movement of the vehicle and to send a message to at least one third party.

According to another aspect, there is provided a communication apparatus for use in a cellular system and comprising:

a first interface, configured to enable establishing a communication link between at least one local sensor and said communication apparatus, by using a non-cellular technology;

a second interface, configured to enable establishing a communication channel between said communication apparatus and at least one user equipment (UE), by using a cellular technology;

a receiver configured to receive data from the at least one local sensor; and a transmitter configured to transmit over the radio communication channel to the at least one UE the data provided by the at least one sensor.

In an embodiment, the local sensor is a video sensor, and the receiver is configured to receive uncompressed video data representing at least one area of the at least one video image from the video sensor and the transmitter is configured to transmit over the radio communication channel to the at least one UE at least one member of a group that consists of: uncompressed video data representing at least one area of the at least one video image received from the video sensor or data retrieved from processing by a processing block the at least one area of the at least one video image.

In accordance with another embodiment, the processing block is configured to generate at least one command or an audio alert which relates to operation of at least one other apparatus connected over a radio link, wherein the command or the audio alert is based on information derived from processing said at least one area of the at least one video image.

By yet another embodiment, the processor is further configured to process the at least one video image for adapting the transmitted data rate at which the data will be transmitted by the transmitter, according to at least one of the following: time-frequency resource or modulation and coding rate, as assigned for transmitting the data over the radio communication channel.

According to another aspect, there is provided a user equipment (UE) apparatus for use in a cellular system and comprising:

a radio interface, configured to enable establishing a radio communication channel based on a cellular technology between the UE and at least one base station or another user equipment (UE); and a processing block configured to:

a) receive over the radio communication channel control information derived from processing uncompressed video data representing at least one area of at least one video image (e.g. in case the processing is done by a remote entity, such as a remote processor, and only control information is transmitted over the radio communication channel); or b) process data representing at least one area of an uncompressed video image received over the radio communication channel (e.g. in case the data of that image is received over the radio communication channel, and its processing is done by the processing block of the UE); or c) any combinations thereof, and to trigger at least one action selected from a group that consists of:

(i) display a video image on the UE display;
(ii) activate an audio alert;
(iii) provide a command to at least one other apparatus.

According to still another aspect, there is provided a vehicle, including a controller and brake actuator or a driving robot, wherein the vehicle comprises a processor configured to analyze uncompressed video data representing at least one area of at least one video image transmitted over a cellular network and configured to determine an action to be taken based on results of processing the at least one image.

According to another embodiment of this aspect of the invention. The action to be taken is a member of a group that consists of: reducing the speed of the vehicle, activating an audio alert, sending a message, sending an alert to a third party, or any combination thereof.

BRIEF DESCRIPTION OF THE DRAWINGS

For a more complete understanding of the present invention, reference is now made to the following detailed description taken in conjunction with the accompanying drawings.

The drawings do not represent an exhaustive representation of the possible embodiments of the invention and the invention is not limited to the arrangements presented in the drawings.

The drawings are.

DETAILED DESCRIPTION

In the following description, for the purposes of explanation, numerous specific details are set forth in order to provide a better understanding of the present invention by way of examples. It should be apparent, however, that the present invention may be practiced without these specific details.

The following description uses terminology familiar to those skilled in the art of wireless cellular networks and in particular in LTE technology. However, this fact should not be considered as restricting the applicability of the invention to these technologies, and it should be understood that the present invention also encompasses other similar technologies as well as evolving cellular technologies.

In the following description is illustrated an architecture of a mobile system, architecture which has been modified for indicating connectivity with short-range information sources, exemplified by low-latency video streaming.

In the following examples both the Information Source and the Information User (IUser) are located within the RAN (Radio Access Network).

The Information Source can be a video camera, essentially being used as a sensor as described in further details in the examples below, a different type of sensor, a radar, a medical device, a robot, a controller, an industrial computer, etc.

The Information User can be a human, robot, a controller, or a processor/computer which may or not generate messages to a human interface (display, voice, sound, vibrations, etc.).

The access of an IUser to an Isource located in the RAN network is considered herein as being a short-range communication. Depending on its type, the ISource can enable different short range services.

Typically, the Information User communicates with the Information Source over a wireless interface, which may also be used for regular cellular communication.

In case that the base station is mobile, for example mounted on a vehicle, the ISource may be installed in the vehicle.

The terms "eNB" or "base station" should be understood to denote all types of applicable base stations, including among others macro, micro, femto or home base station, small cell eNB, relays, remote radio heads, associated with classical architecture or C-RAN architecture. All the transmitters may be considered as Transmission Points (TP).

The I-Source may be embedded in an eNB or within a UE or may be connected to either one of them through a non-Uu interface which may be wired or based on wireless standards, such as IEEE 802.11 or IEEE 802.15, a proprietary wireless network, etc.

The term "Uu interface" as used herein should be understood to encompass both the physical and link layers of the cellular communication extending between a base station and a UE.

System Architecture—ISource Connected to eNB, UE Connected to the Same eNB

Figure 1:
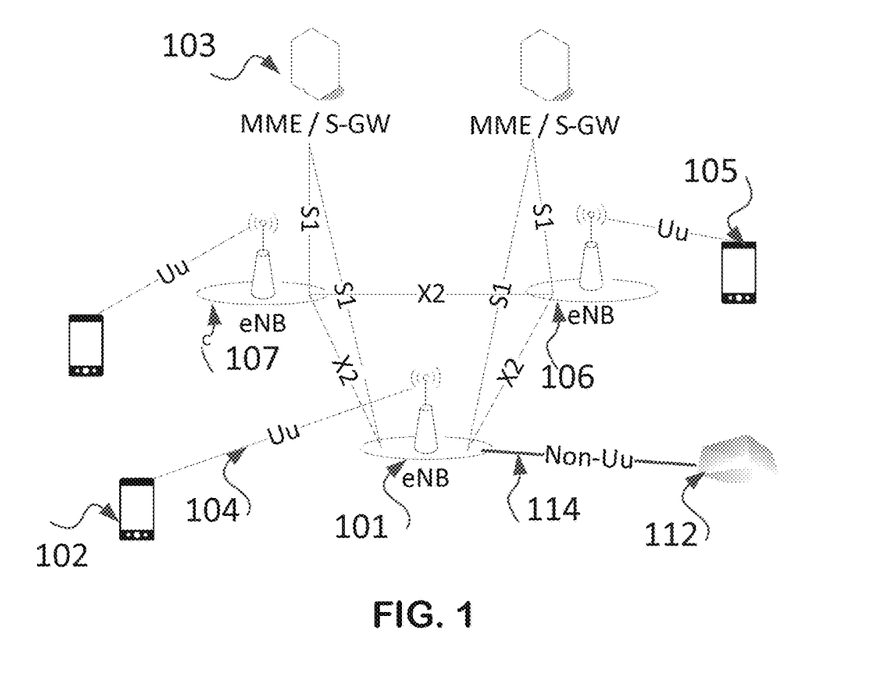
FIG. 1—Represents a system architecture in which the Information Source (ISource) is connected to the serving base station.

A first example of system architecture according to the present invention is depicted in FIG. 1, where LTE architecture is used for exemplification. The existing LTE system architecture includes an eNB-101 (base station) which communicates over the air with UE-102 (User Equipment), while using air interface Uu-104. UE-105, connected to eNB-106, does not receive data from ISource. All eNBs may provide regular radio access services and may further communicate with the MME/S-GW-103 (Mobility Management Entity/Service Gateway). The S-GW acts as mobility anchor for the UE in its communication with the Internet and Multimedia Servers.

In addition, the system includes an Information Source (ISource)-112 which communicates with the eNB-101 over an interface 114 which is non-Uu (NUu) i.e. being a different interface from the cellular interface Uu. The eNB can be either fixed or mobile.

NUu interface 114 can be a communication interface, for example an IP interface over any suitable medium, including wired or wireless medium, a video interface for uncompressed video over Ethernet, HDMI, HDbaseT, DVI, USB, ATM, etc., a video interface for compressed video, such as MPEG2 or MPEG-4, an interface for retrieving information from a sensor connection, like a temperature sensor, an interface for industrial data communication, like Actuator Sensor Interface, AS-i, etc.

Bearers

In LTE networks, the data Bearers allow the connection between an application running on UE and the S-GW (see FIG. 1) while enforcing a specific QoS (Quality of Service) level. In fact the radio bearer (RB) is continued at the eNB with a NAS (Non-Access Stratum) bearer.

In the case of the architecture referred to herein, a different bearer is preferably used, which connects UE to the eNB and terminates at the eNB, instead of extending to the S-GW. Following are some examples of how to achieve this change:

1. Reserve one or more bearers for local user data transport;

2. Introduce a flag indicating local termination or EPC termination.

Furthermore, the new bearers should have a specific QoS level. The QoS level may be set as a function of the allowed delay and packet loss of the sensor or of its control elements.

The short-range information can be split between data and its intrinsic control information, where the control information is related to the commands, for example to actuators which produce a movement, to positioning a video camera, etc.

The differentiation between the data and its control information should be made either by different transport addresses for data and controls or by different fields in a message header carrying the user data, including both data and its controls.

System Architecture—ISource Connected to UE

Isource connected to UE is part of the architecture used today for connecting different sensors to the Internet. In contradistinction to this architecture, in the system provided by the present invention, the data generated by the ISource will remain in the access network, i.e. at eNB level, and will not be forwarded through the S-GW towards the P-GW (Packet data network GW).

System Srchitecture—ISource Connected to eNB, UE Connected to a Different eNB

Figure 2:
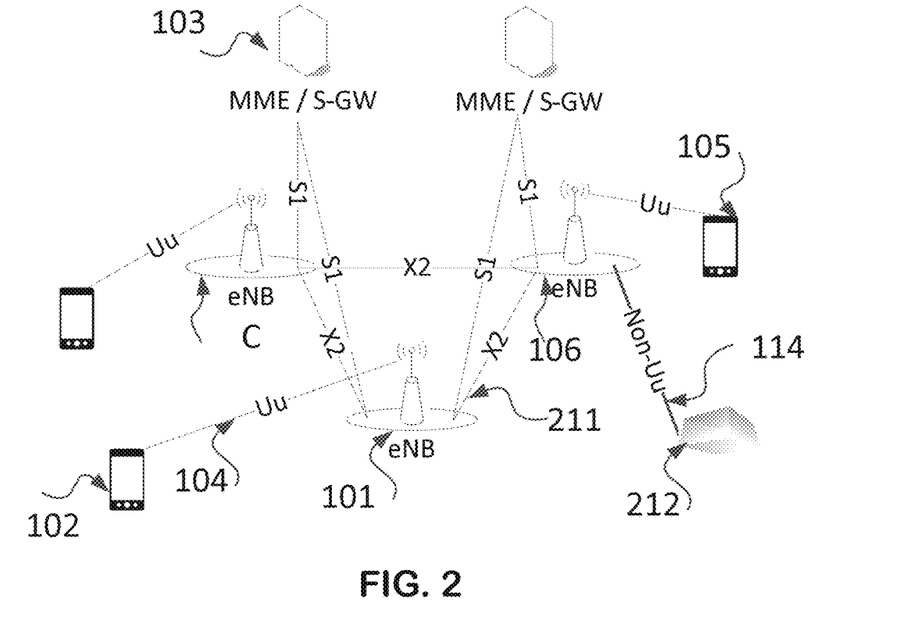
FIG. 2—Represents a system architecture in which the ISource is connected to a non-serving base station.

In another embodiment of the present invention, the data from the ISource passes through an interface connecting two base stations, for example X2 interface. FIG. 2 illustrates such an example. The ISource-212 is connected to eNB-106, while UE-102 receiving the data from ISource is connected to eNB-101. X2 interface-211 connects eNB-101 with eNB-106.

Data can be transmitted between eNBs in an S1 or X2 "transparent container", being directed by the receiving eNB Controller to its recipient UE. However nowadays both 3GPP TS 36.413 V12.2.0 (2014-06) and 3GPP TS 36.423 V12.2.0 (2014-06) do not define any transparent container for UE data transfer between eNBs having the functionality of transferring data from an ISource connected to an eNB or a UE, to another eNB or UE. The existing transparent containers are used only for the purpose of executing a mobile handover.

System Architecture—D2D Communication

Figure 3:
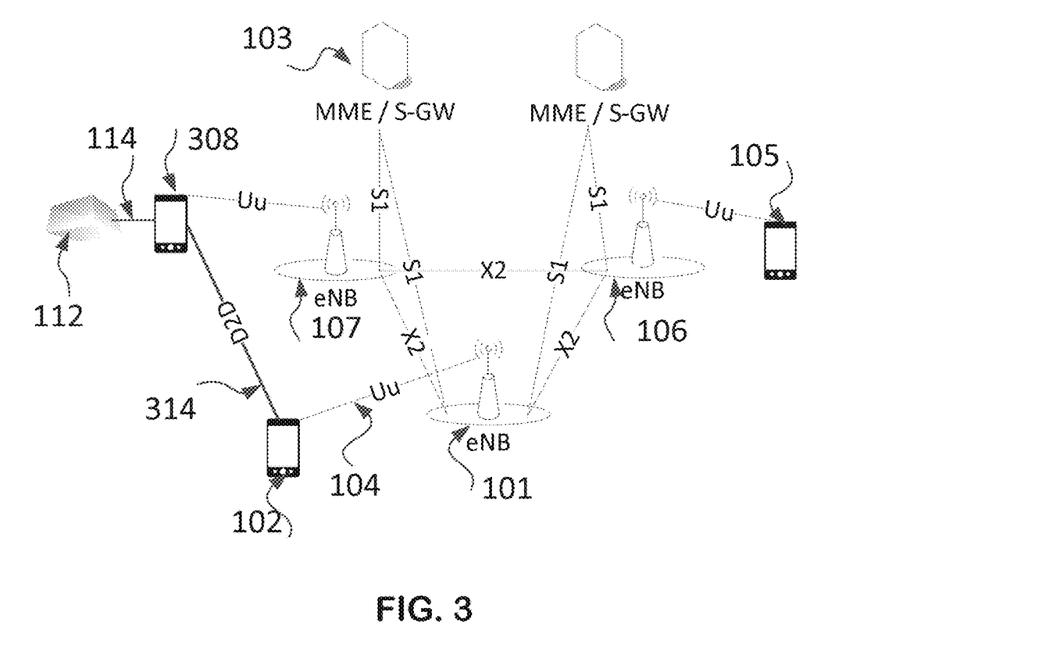
FIG. 3—Represents a system architecture in which the ISource is connected to the to a UE (User Equipment) using D2D (Device to Device) communication.

A different option is that data from the ISource will be transmitted over a D2D interface to a UE without passing through the eNB. FIG. 3 illustrates such an approach, where the UE-308 is connected to the ISource-112 through the non-Uu interface 114. Alternatively, the ISource can be embedded in UE-308. The UE-308 communicates via a D2D-314 wireless interface with the UE-102.

The UEs communicating over a D2D interface may be connected to different eNBs, as shown in FIG. 3, or to the same eNB.

In this case it would be preferred that the eNB serving the UE connected to the Isource will broadcast the type of services offered by the Isource through a new SIB (System Information Block), as explained below, respectively the UE will broadcast a D2DSIB (D2D System Information Block). D2D-specific information should indicate the scheduling assignment for the transmission of each ISource.

Other type of architectures, including combinations of the architectures discussed hereinabove, may be also used.

Connections Associated With the Information Source

The ISource should preferably be connected to the eNB through both data and its control connections. In addition, the ISource may contain additional processing capabilities not included in the actual sensor device. For example, in case of low-latency video streaming, the HD (High Definition) data rate reduction can be such an additional processing.

The data connection and its control connection can use the same or different physical interfaces. HDMI video interface includes camera control commands, for example pan/tilt/zoom, but there are no messages related to the interaction between eNB and ISource. Such messages can form a new logical interface using any suitable connectivity interface.

Integration of the Information Source into the Cellular Network

The Information Source should be identified, using for example its Ethernet MAC Address (a unique identifier), or the SIM (Subscriber Identity Module) used in cellular communications, or a manufacturer code.

Using a SIM as an identifier for the Information Source enables the integration of the I-Source, even if not connected through the cellular air interface, with the cellular core network, with HLR (Home Location Register) and AuC (Authentication Center), part of the HSS (Home Subscriber Server), by using the same high-level protocols as a typical cellular UE.

For example, the HSS authenticates the ISource based on the information comprised in its SIM card.

The Information Source with SIM may execute the Attach procedure. As part of the procedure, the Initial UE Message should be sent first over the S1 interface, as described for example in 3GPP TS 36.413.

The Information Elements comprised in these messages should include as a minimum the information that relates to the maximum data rate or the data rate range of the Isource over the non-Uu connection. The non-Uu connection should preferably be further encoded as wired (and its type(s)), wireless IEEE 802.11, wireless IEEE 802.15, proprietary wireless communications, etc.

For enabling the IaaS concept, each type of Information Source should preferably be listed and identified in a data base by a code and eventually by a descriptive text including key words.

ISource position should preferably be indicated in the data base for example by GSP or other positioning system, by proximity to an eNB or by a street address in a text format. The code may be used for a protocol used for exchanging communications between the data-base and an eNB or a UE, while the key words may be used by the UE (User) for searching an entity that provides a required service in its proximity.

In addition, the means for communicating with the eNB or with the UE within which the ISource is embedded or connected to, should be preferably provided. Such means may be the eNB or the UE IP Address or a UE Identifier, which preferably should also be included in the data base.

In case that the ISource is embedded in a UE, the UE ID (identifier), being visible in the access network, together with a code (port number, etc.) could be used to identify the ISource.

Similarly, in case that the ISource is embedded in an eNB, the eNB IP address or the eNB Identifier together with a code (port number, etc.) could be used to identify the ISource.

An eNB could also indicate to a served UE, based on its subscription information stored in the HSS or by applying a more dynamic registration approach, which ISources that are offered by other eNBs, could be connected to the advertising eNB which will operate in such a case as a relay.

In a LTE system, the entity which has the information as to which eNB(s) a specific UE is connected, is the serving MME.

Service Capabilities and Operational Parameters

The type of the Information Source and its operational parameters can be considered as being part of base station or UE Service Capabilities. The low-latency DL (downlink) video streaming of the circulation on a road should be listed as an eNB capability, while the D2D video streaming as a UE Capability.

For example, in the case of a video camera, the Operational Parameters should include an identification of the video framing based on the Standard applied or the exact frame format parameters (active pixels per horizontal line, vertical line, 3D), the video frame frequency, the transmission mode (progressive or interleaved), color coding, supported compression modes, manufacturer and product ID.

Discovery of Cells Which Transmit Signals From an ISource

For discovering a suitable ISource by a mobile UE, one of the following two basic approaches may be used:

A. The service is a part of the services advertised over the air by the eNB or a UE.

B. The cell identifier of the cell transmitting the information and the service code or ISource code are known from a data base, as explained above.

Advertising Over the Air

A mobile UE that wishes to connect to a desired ISource has to find out first the eNB which can connect an IUser to that ISource. If the mobile UE and the UE connected to the ISource can use both a D2D (Device to Device) cellular technology, the connection can be made directly between these two UEs.

In an LTE network, an eNB operates a cell for a specific frequency channel. Using an over the air interface (referred to as Uu according to LTE terminology), the UE may decode a cell identifier which is sent at regular times. In IEEE 802.11 such an identifier is BSSID identifying an Access Point, while in LTE such an identifier is a Physical Cell Identity (PCI), which can be derived from the primary and secondary synchronization signals sent every 10 ms. Physical Cell Identity is an ambiguous identifier for eNB and can be repeated within the network, thereby it is possible to have cells associated with different eNBs having the same Physical Cell Identity. A better LTE identifier is Cell Identity, which is unique for an operator. Cell Identity is sent in System Information Block 1 (SIB1), which is repeated at a maximum 20 ms interval.

In an embodiment of this invention, a list of each connected Isource and its type should be transmitted over the air in a new System Information Block (SIB) or in at least an Information Element within an existing SIB. This new SIB should be scheduled for frequent transmission, for example 10-20-30 ms.

In a special embodiment of this invention a video camera is connected to an eNB or to a served UE or to another eNBs in its vicinity.

The base station may transmit the supported services (for example local video broadcast or multicast) and their operational parameters to an IaaS management center. The latter will control which parameters will be used, or the base station may determine locally the value of parameters.

The eNB will advertise over Uu interface its service capabilities to the served UEs, or a served UE will query the eNB about its service provisioning capabilities. As a result, the eNB will provide the service through the connection to the ISource, over Uu interface, to the UE wishing to receive this service.

New messages should be defined between the UE and the eNB in order to allow this functionality. Such messages should include as a minimum the type of the ISource and the means for communicating with it or with the eNB/UE within which it is embedded. Additional information could be the position of the ISource, given by its GPS (satellite) coordinates or as derived based on the PRS (Positioning Reference Signals) transmitted by the eNB or as a descriptive free text.

The connection to the ISource can be a unicast connection (e.g. for a specific UE), or a multicast/broadcast connection (e.g. for several UEs). Specific radio aspects may differ from the existing MBMS/MBSFN service as described in 3GPP TS 36.211 V12.2.0 (2014-06).

The eNB may take into account when advertising a service at least one of: the actual processing capabilities of the receiving or transmitting UE, the backhaul capabilities of the serving eNB, the serving base station available radio capacity or current load status.

For example, if a 100 Mb/s non-compressed video stream is generated by an Information Source located in the vicinity of a base station but the X2 interface of the base station is using an ADSL connection with an uplink rate of 3 Mb/s, the UE cannot get access to this ISource. Same limitation occurs if the backhaul is Fiber but the UE is of Category 2, supporting only 50 Mb/s downlink data rate.

In principle, an ISource with wired connection is fixed, however an ISource connected to the base station through a wireless interface can still be mobile. The ISource mobility is determined by the mobility of the eNB or UE to which it is connected or at which it is embedded. The mobility type of an ISource should be included in its capabilities list and be considered by the advertising eNB.

In some embodiments an ISource could be requested based on different reasons including load balancing, to perform a handover to another eNB (if possible).

Application Level

The applications hosted by a UE are developed based on open operating systems, for example iOS and Android. The applications are written based on programming interfaces, named API (Application Programming Interface). Some of these programming interfaces, as Telephony Manager in Android, allow the programmer to access radio-specific parameters, for example RSSI and cell names.

In order to enable the operation of a system as described hereinabove a new functionality of the programming interfaces should preferably be provided, that allows the following:

A. to communicate the service capabilities of an eNB or a UE to other eNBs or UEs in the geographic area of interest, using an inter-eNB communication interface, for example X2, or a transparent container over S1;

B. to access the eNBs operated by additional PLMNs (Network Operators) for the purpose of using the services provided by them;

C. to access a database (belonging to an operator or to a number of operators) of eNBs or UEs providing the required services, including also the position information of the eNBs and of the offered ISources and to make the information available to UE application developers.

D. to provide the developer of an application with a programming interface listing the services supported by a base station or by a UE connected to the base station or alternatively with the type of external sensors supported by a base station or by a UE connected to that base station.

E. to provide the developer of an application with a programming interface listing which external sensors are available, where are they connected and the port number or any other applicable identifier.

F. to provide the developer of an application with a programming interface listing one or more of the following: external sensor capabilities, maximum operating range, manufacturer, power requirements, video frame format type, compression type, minimum data rate.

G. to provide the developer of an application with a programming interface for acquiring data from the sensor.

H. to provide the developer of an application with a programming interface allowing registering and unregistering sensor event listeners that monitor sensor changes.

Stand-Alone Network Operation

A stand-alone eNB can be installed at a private or enterprise location by the User, to provide Uu connectivity for a single type of ISource.

In this latter case, the ISource may use an identifier which is not a SIM and the ISource will be considered by the eNB as an I/O device. The same data and control interfaces should be defined.

The network architecture in this case may not include the MME/SGW and the HSS and other core network servers. The PLMN (Public Land Mobile Network or simply Network Operator) identifier of the access network created by the stand-alone eNBs may be different from the PLMN used by the cellular operator, even if in practice it is the same operator for both networks.

A UE will disconnect from the ISource when executing handovers, being connected to the ISources located within its radio proximity.

Simplified procedures are needed for such an operation. However for enabling a UE to utilize both cellular and stand-alone eNB services, the PLMN identifier of the stand-alone base-station(s) should be enabled by some entity, for example by provisioning or by an application running on the UE.

An example of such operation is the low latency video of the streets/roads for avoiding car accidents. The operator and base station owner could be the local Municipality, while the user will receive mobile services through the mobile operator, using a different PLMN identifier.

The double operation of a UE with two PLMNs can be achieved with Dual Connectivity, where the Master eNB could be deployed by the cellular operator and the Secondary eNB could be deployed by the Municipality.

A special case of operation in a stand-alone mode is the use of TDD in licensed or license-exempt frequency bands, for example 5 GHz, 60 GHz or White Spaces below 1 GHz or in other shared bands.

Example of Vehicular Application for Low-Latency Video

For a better understanding of the invention, let us consider a possible use case which requires a low latency but is less demanding in terms of color quality.

Figure 4:
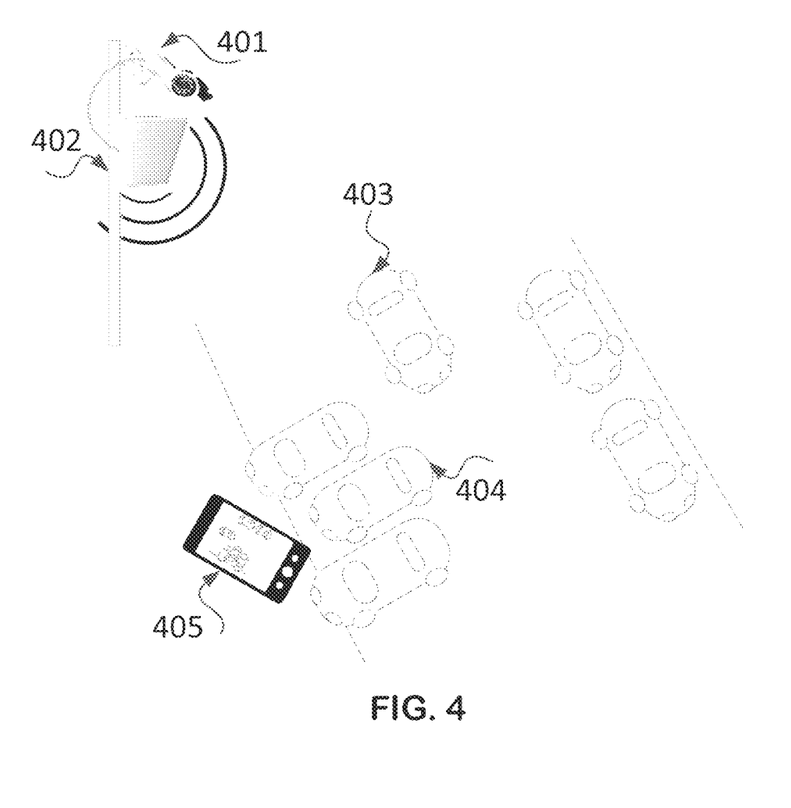
FIG. 4—Represents an example of system use for road security.

In FIG. 4, a video camera-401 is presented as connected to an eNB-402 and over radio to a smartphone-405 or to a dedicated mobile receiver. The smartphone, or the dedicated mobile receiver in a vehicle receives an image of a street and of the current traffic at it, image which is not directly accessible to the person driving the vehicle or to video sensors of the vehicle itself, being hidden by the surrounding obstacles. This situation may happen for example when exiting a sub-terrain garage, when entering an intersection, when driving on a serpentine road, while driving backwards, etc.

The typical solution nowadays to improve the driver's visibility in such places is to install a mirror so that the driver can see if a vehicle is approaching from the hidden part of the road. However, in many cases the image is distorted, it becomes visible to the driver too late and it is difficult to establish within a short period of time, the direction in which the vehicles are moving. Parking places as shown in FIG. 4 or road intersections which lack visibility because of parked vehicles or because of their orientation, may be a source for accidents.

In FIG. 4 a camera 401 is sourcing the low delay video image of the street to a radio transmitter (eNB) 402; the radio receiver-404 in the vehicle displays the image of the street on a smartphone-405 which is in the vehicle and belongs to a person or is part of the vehicle accessories. Vehicle-403 moves at say 50 km/h while the driver of vehicle 404 wishes to exit the parking place. The driver of vehicle-404, who cannot see the street traffic due to the other vehicle which is parked in parallel, becomes aware of the danger while viewing the image received through the radio receiver and displayed on the smartphone, thereby he is able to avoid an accident with vehicle 403. In addition to the video display or instead of it, the driver can receive audio alerts on the imminent collision, alerts resulted from image processing.

An MPEG-4 image requires certain time for video compression, which is in the order of 300-500 ms. Approximately the same time is required for decompression, resulting in a total of up to 1 sec. A vehicle moving at 100 km/hour advances approximately 27 m within one second (13 m at 50 km/hour), while the breaking distance of a vehicle is up to 40 m at this speed (20 m at 50 km/hour). Thus, if MPEG-4 compression techniques were to be used, the smartphone would provide only the previous position of the coming vehicle (i.e. the place where the vehicle was a second ago) which may mislead the driver assessing the risk of collision. The new ITU H.265 video codec requires even a higher coding time.

Reduction of Video Data Rate

The video format and the color depth have a significant influence on the data throughput of the mobile phone. For example, the HVGA format used in some smartphones defines a video format of 480 lines and 320 columns, i.e. 153 600 pixels. While using 256 colors (8 bits), the amount of data to be transmitted per frame is 1.23 Mbits and in case of 30 frames per second, resulting in 36.9 Mb/s, which is suitable for LTE smartphones.

However the frame format used for HD (high definition) uncompressed video, which is more suitable for video cameras and is used also in some high-end smartphones and tablets, defines at least 1280*780 points at 24 bits of color and 24 frames/s, resulting in a data rate of 575 Mb/s, which is obviously too high even for the Category 4 type of phones (see TS 36.306 V12.1.0 (2014-06)), which are able to receive up to 150 Mb/s in FDD mode. Also a 720*576 video format at 50 frames/s and 24 bits for color results in a similar 531 Mb/s.

In TDD mode, the Uu downlink data rate is reduced depending on the number of subframes that are used in the uplink direction. Also, in real deployments, the lower modulation and coding rate will lead to significant data rate reductions, such that no more than 60 Mb/s in a 40 MHz Carrier Aggregation mode, could be considered as a realistic target.

Some of the possible solutions for reducing this data rate to less than a 60 Mb/s are presented below.

Solutions for Reducing the Video Data Rate

A number of solutions that may be hardware implemented are presented below:

A. Reducing the 24 color bits to 8 bits. This solution should suffice for most of the low latency applications, for example RGB 3:3:2 palette or YCbCr.

B. Using only a part of the HDMA video screen, i.e. using 960*640 pixels from a HDMA screen of 1280*720 pixels; these two steps lead to a 123 Mb/s rate.

C. Decimating the lines or using interleaved line wireless transmission instead of progressive line wireless transmission, leading to a two times reduction of the data rate, to 62 Mb/s;

E. Compressing the image by transmitting the video intra-frames in their uncompressed form and the changes relative to intra-frames that occurred within the proceeding frames, in their compressed form.

As will be appreciated by those skilled in the art, many variations of the above are possible. For example, using 12 color bits instead of 8 color bits per pixel, etc.

Retransmissions

An aspect to be considered is the update of the video image in case that the packet carrying the video data has been corrupted (e.g. by noise and/or due to interference) and cannot be decoded. If HARQ is operational for the radio video transmission, it will introduce a delay of 9-10 ms, and suitable spare time-frequency resources should be allocated for retransmitting the corrupted packet. As some UEs may have received the data correctly, those UE should be able to discard the subsequent transmissions of the same data.

If no HARQ is applied, there are in principle two possibilities: either to display the previous video data, or to blank the image for the duration of the un-decoded pixels.

In order to absorb the delay and jitter generated by the wireless network, a data buffer is preferably used at the receiver.

Synchronization

The MPEG solution for video frame synchronization is based on GPS time stamps at both transmitter and receiver locations. However, in the cellular architecture, the time stamps are inserted in the encoded MPEG stream at the video encoder, while in our case there is no embedded time-stamp in any of the video and audio interfaces, being instead analog synchronization signals generated by the source.

This means that the video adapter module (Isource Adapter) at the wireless transmitter has to add a time stamp derived from the video interface control signals and using a GPS-based or other high precision reference before the transmission of a well-known pixel, for example in the horizontal or vertical blanking interval before the transmission of the first line or before a line M, or alternatively after the transmission of the last line in the video frame or after the transmission of a line N.

The video module in the wireless receiver will compare the received time-stamp with a local-generated time-stamp based on the GPS or an equivalent reference signal and will instruct the PLL to modify the pixel frequency for compensating the time drift between the two time stamps.

Dependence of Video Data Rate and Wireless Resources

The wireless resources are spread into many frequency bands, composed of frequency channels. In each frequency channel time intervals or subframes are defined and in the case of some cellular technologies, such as LTE, physical resource blocks (PRB) are also defined as a minimum frequency resource to be used in the scheduling of transmissions.

A base station transmission can typically be an FDD (Frequency Division Duplex) or a TDD (Time Division Duplex) type of transmission.

The resources can be allocated within a frequency channel or by using a combination of frequency channels within the same frequency band or in different frequency bands while using the Carrier Aggregation (CA) mode, in which two or more frequency channels can be aggregated. In the CA mode the frequency channels can use the same duplexing type (FDD or TDD) or can use even different duplexing types.

The amount of the transmitted data depends on the available time-frequency and MCS resources which can be allocated for that transmission. A time resource in cellular technology is in general a subframe. The frequency resource is the sum of allocated bandwidth, for example the sum of the channel bandwidth or the sum of allocated PRBs or a combination of both.

The wireless transmitter of the video stream can use a Modulation and Coding Scheme (MCS) which is provisioned or dynamically established based on CSI (Channel State Indicator) measurements reported by the pair UE (in case that the scheduling is done by eNB) or by the UE independent transmitter in case of D2D communication or by using test procedures. Based on the MCS and the available radio resources, the radio transmitter or the base station scheduler can assess the possible User Throughput.

In case of low latency video transmission, the video data rate should be adapted in a way that allows transmission of the video images within the available time-frequency resources. These resources may be low in the licensed bands below 2.5 GHz, medium between 2.5 GHz and 5 GHz, high in the 5 GHz unlicensed bands and very high in bands above 5 GHz.

A specific video camera may support only the mandatory video frame formats, video frame frequency and color codes. A specific video receiver (display) may support only few types of display framing, color codes and video frame frequency. A wireless transmitter can have restricted time-frequency resources which may impose a reduction of the video data rate when compared with the video data rate generated by the video source (camera).

A message should be sent from the scheduling entity to the ISource or to the Image Adapter for providing the information on the achievable user throughput.

In response, the ISource or the Image Adapter at the transmitter should change the parameters of the video transmission and communicate the new parameters through a message to the Image Adapter at the receiver side.

For avoiding mis-operation, the Isource or the Image Adapter or a managing software shall be aware of the supported display modes (video framing format type, color coding, frame frequency) at the receiver.

Video Camera

Typically, the video camera includes an image sensing array, a scanning system configured to scan the image sensing array for different pixel numbers per horizontal and vertical, an analog-to-digital converter connected to the image sensing array, a radio interface and a signal processor compliant with a cellular technology and at least one microcontroller or digital signal processor configured to control the scanning system and to transmit uncompressed video data that corresponds to a selected frame format over the cellular interface.

Preferably, it should be possible to select a geometric area, such a rectangle, a square, a circle, an ellipse, defined within the video frame, and to ensure that within this geometric area, the refresh rate is different from the refresh rate of other geometric areas of the frames.

In order to avoid a bottle-neck scenario in the radio system, one should preferably make sure that the image scanning is fast enough so that data is available when the radio can transmit it. Therefore, the scanning system should be controlled in a way that it can provide the uncompressed video data in a given time interval.

In addition, the control information that relates to the selected video frame format, geometric form and its color code, should be adapted to the available time-frequency and MCS (Modulation and Coding Scheme) radio resources for the transmission of the uncompressed video data.

For communicating with such a camera over the cellular network or for authenticating it for use within the network, it is recommended to include a Subscriber Identity Module for at least one of the SIM possible geometric forms.

Control of the Video Framing and Color Coding

The selection of the video frame format and of the color coding mode should be based on both the data rate limitation of the wireless interface, the frame format type and color coding as supported by a specific display and application.

Operation in Unlicensed (LE) Bands

The use of the LE bands may require radar detection, which can consume approximately 10-20% of the radio resources available. In addition, it may be required to perform a Clear Channel Assessment with a random defer time.

Both operations introduce silence periods, thus creating a possibility for other transmitters using LBT (Listen Before Transmit) to use the channel, thereby creating delays which are unacceptable for low latency video transmissions.

It is recommended to use the virtual channel reservation by sending CTS (Clear to Send) or RTS (Request to Send) messages as defined in IEEE 802.11 for protecting the un-compressed video data stream.

Generation of PDUs (Protocol Data Units)

PDUs are packets received from the ISource. Based on the importance of different portions of an image to the user, different pixel densities, color depths and refreshing rates can be used for different portions of the image.

Preferably, it should be possible to define one or more rectangular areas of interest in which the rate of refreshing the data associated with these areas and/or the pixel density thereat should be higher. A higher refreshing rate is reflected in the shortening of the time intervals at which the pixels of this area are transmitted. On the other hand, the refreshing rate could be lower for static or remote objects.

Other possibilities include lower pixel resolution for big objects.

Such an area of interest can be defined by a specific horizontal line, a first pixel in the area, a number of pixels comprised thereat and/or a number of horizontal lines. In addition the image can be down-sampled to reduce the number of transmitted pixels.

When receiving a new image, the Image Adapter block should apply different preprocessing to the areas of interest and to the less interesting areas, impacting the data rate reduction and the frequency of the PDUs generation. For each selected area there will be in general more than one PDU.

Each PDU should contain a header that allows reconstructing the image. This header may indicate the vertical and horizontal place of the first pixel, represented by its color code, within the video frame, the usage of video progressive or interlaced mode, the color coding method, the number of pixels included in the PDU, the QoS bearer type, the PDU discard policy, etc.

The MAC scheduler will provide a higher priority to those PDUs having a higher QoS bearer type, so the PDUs representing the area of interest should be designated with a higher QoS.

In addition, given the high data rate of the low-latency video, the utilized resources will span over different subframes and even component carriers. Each component carrier or subframe or subband, may be characterized by being exposed to different interference levels and the scheduler may use different MCSs.

An improvement to the LTE downlink scheduling approach could be by defining different MCSs per UE and per sub-band, instead of defining the MCS per UE and per subframe, thereby allowing a better mapping between MCS and the interference in the part of interest of the video image.

A special case is the use of unlicensed spectrum, where the interference level can be higher as compared with that of the licensed spectrum.

A general policy in case of Carrier Aggregation could be the use of a less-interfered carrier for the PDUs having higher QoS requirements.

In case that a PDU is discarded, the discard policy can indicate, for example, to retain the existing samples for the corresponding part of the video image or to fill it with a given color code.

IaaS Concept With C-RAN

C-RAN (Cloud-RAN or Centralized-RAN) is a concept in which one or more of the lower layers functions (Physical, Link, S1 and X2 communication interfaces) are moved from the base station to a centralized processing and control equipment, having a location different from the Radio Head location which actually transmits the radio signal.

In some applications, the location of the Information Source is not highly important, but in other application the ISource should preferably be located at the proximity of the radio transmitter.

C-RAN architecture, as currently defined (ETSI GS NFV 001 V1.1.1 (2013-10)) does not allow attaching an ISource to a Radio Head, as the existing RHs carry only radio related information. For enabling the functionality described herein, it would be required to add data and control communications for connecting the ISource on relevant premises to the Radio transmitters, i.e. to the Remote Radio Heads, which may embed or be connected to a ISource as described hereinbefore.

In order to achieve this goal, the ISource data should preferably be multiplexed with the data transmitted by the RRH, for example, as described in the CPRI Specification v6.0 (2013-08-30).

The RRH transmits digital data as IQ data blocks. Some of these blocks, not containing the radio receiver data, may be replaced with data blocks containing external data, i.e. data from ISource; the control block can indicate the nature of actual transmitted data. The data from ISource may contain a header describing the actual length and/or other relevant parameters.

The radio receiver data should be transmitted only for the valid receive activity, based on scheduling information for the up-link traffic.

Applications Using Low-Latency Video

In embodiments where low latency video transmissions are used, the UE should preferably create a connection at the application level with the serving eNB and request the service capabilities of the serving as well as the neighbor eNBs. This operation assumes that the Service capabilities of the Neighbor eNBs are either provisioned or can be retrieved over S1 or X2 interfaces. It should be noted that none of S1/X2 interfaces supports today (3GPP TS 36.413 V12.2.0 (2014-06) and 3GPP TS 36.423 V12.2.0 (2014-06)) exchange of such messages.

In an embodiment of the present invention, the Service Capabilities of the serving and neighbor eNBs are transferred by the serving eNB to the application. At this stage, the application can retrieve the possible services and to select the service of interest and its operational parameters. Optionally, the application may propose in response its own preferred parameters.

Alternatively, the possible services that may be provisioned by a neighbor eNB are filtered to match the UE subscription, and one or mode codes are provided to the UE, for example the multicast group identifier and the decryption or descrambling code or key. Based on these codes, the UE may obtain the scheduling information and decrypt or descramble the received data.

The application causes the UE to connect to one of the relevant eNBs. The UE will select the right eNB based on radio considerations (e.g. RSRP, RSRQ) and possibly based also on other information, like the current load at the target eNBs. Based on the UE request, the serving eNB will either execute the handover to the selected eNB or will connect to it while operating in a Dual Connectivity mode.

The data received by the UE may be displayed, processed or any combination thereof. The UE may delegate the processing in its entirety (or part thereof) to the serving eNB connected to the ISource. After processing, the serving eNB will send to the application of the UE, on a special MAC address or bearer, the results, including information to be displayed or to initiate audio/voice alerts.

It should be noted that the base station operating system is not open for applications. Even in centralized C-RAN concepts, where the base station radio behavior can be virtualized at different levels, the programmer has access only to radio-related resources but not to application-level related resources.

The UE may integrate the information on the maps (Location Based Services) and provide guidance on how to reach the location.

In road safety applications it is also useful to correlate the image with a map and to mark the UE (vehicle) location on the map. The person using the application may then determine more easily if there are any potential risks. A controlling entity may further be used to recommend a traffic speed function based on the image analysis results.

ISource and Application Specific Information

The eNB and UE may need to provide IUser information which is specific for the ISource installation and operation.

In case of the video stream that presents the current view of a street, preferably, it should also include user-friendly information, such as the street name and the position of the camera sensor versus the axe of the street (North, South, East, West or other applicable combinations).

When approaching an intersection, there are two directions from which a vehicle can come. For each direction a different camera should be used which will capture the image of the coming vehicles. The application should identify the direction of the vehicles which are closest to the UE. This can be achieved based on the energy of the reference signals, if each one of the two video cameras is connected to a different radio transmitter (either eNB antenna, different RRH or different UE).

Image processing by a processor installed in the UE or in the eNB or in an internal/external chip/module can be used to detect a potential collision and make the UE user aware of that risk by generating an audio signal or voice alert.

In case of an accident or fire, the application running on a UE can alert the first responders (police, ambulance, fire service, etc.) and provide the location of the event.

Optionally, the application can provide a human interface to enable the user to indicate one or more areas of interest of the video image.

Radio Specific Behavior

A road-safety application as the one described above that uses low-delay video is preferably configured to retrieve from the UE located in the vehicle a list of neighbor base stations and their ID. The list comprises the ARFCN (frequency channel) information, PLMN and the eNB or UE ID. Another possibility is to use the TPID (transmission point ID).

The application shall be able to know to which cells or transmission points ("TPs") a camera is possibly connected, to control the physical layer of the UE for searching for the discovery signals of the cells indicating their presence, including the synchronization signals carrying the Physical Cell identifier on the suitable frequency channel(s). Then, to establish if the received Physical Cell Identifier is found in the list, and based on the energy of the synchronization or other discovery signals, to request the network to carry out a cell switch over or to add the cell in a carrier aggregation mode or in a dual connectivity mode.

The process of the connection to streaming video should preferably be very short. One option for carrying out this process is to configure the SIB1 (System Information Block 1) to carry a special indication, such a special PLMN, which may be used for road safety applications.

If dormant, the cell transmitting the video image can be turned on following the detection of an approaching vehicle by a proximity sensor connected to an eNB either by wire or wirelessly.

Another possibility is the standardization of new cell/D2D discovery signals indicating time-sensitive applications like low delay video.

If the video camera is connected behind a UE, a similar process can take place based on D2D Reference Signals. The UE in the vehicle shall be configured or receive a message from the eNB containing the D2D Scheduling Assignment, representing the repetitive pattern of time-frequency resources in which the video streaming will be received.

In order to achieve this goal, first would be required to identify the UE transmitting the video, by monitoring the D2D discovery resources. Additional information could be provided by transmitting the UE capability to support the road safety services or low-latency video services. The UE in the vehicle (i.e. the application), in case that the UE transmitting the video is connected to a base station or TP, should request to communicate with the UE transmitting the video and receive therefrom the Scheduling Assignment and other operational parameters (multicast group identifier, decryption key or descrambling code), to enable that receiving UE to decode the transmission.

If the UE transmitting the video is out of base station coverage, the service parameters can optionally be pre-configured.

Programming Interface for Low-Delay Video Applications

In order to carry out the described video applications, a programming interface should preferably be configured to provide the application developer with a list of services supported by a base station or by a UE connected to the base station, or a list of external sensors supported by a base station or by a UE connected to that base station.

In addition, the programming interface should be configured to enable retrieving information like: which external sensors are available, where are they connected and the addressing information (port number, etc.) as well as one or more of the external sensors' capabilities, for example maximum operating range, manufacturer, power requirements, video frame format type, compression type, minimum data rate, and the like.

The programming interface should preferably enable the programmer to retrieve the data acquired from the external sensor and should be configured to allow forwarding commands to the sensor.

In addition, the programming interface should preferably be configured to allow registering and unregistering sensor event listeners that monitor the sensor changes.

Lawful Interception

In a number of countries service providers are required to maintain copies of certain communications.

If the communications pass through a base station, either the base station or the recording devices in the non-access stratum can record the information. In the latter case, the information should be forwarded by the base station. In the case of low-latency video, the information used for Lawful Interception can be compressed.

In case of D2D communication in which both radio transmitters are within the network coverage, the transmitted information can be received by the base stations, with the condition that the MCS and the number of layers used by both UEs for D2D, make the reception by eNB, possible.

The fact that bi-directional communications should be recorded for both directions by the same device is in fact translated to a requirement that both UEs will be within the coverage of the same base station. The transmission of each UE should use the highest possible MCS and layer number, such that the eNB will receive the transmissions while using the resources allocated for D2D communication. Similarly, with respect to CSI in eNB to UE communications, the highest CQI index and number of layers (rank) for a given error rate is assessed by UE and transmitted on PUCCH or PUSCH to eNB, it is needed that the eNB will transmit, based on UL reference signals, a CSI-like information to UE including CQI (modulation and coding index), PMI (Precoding Matrix Index) and RI (Rank Indicator).

However, in general the PMI may be different for D2D communications from UE-eNB communications, and similarly other parameters may also be different when implementing D2D communications as opposed to those associated with UE-eNB communications.

To overcome this hurdle, two CSI parameter sets should preferably be defined for D2D communication and exchanged between the UEs in the D2D pair:

a. A first CSI set (CQI, PMI, RI) referring to D2D receive operation of the reference signals generated by the transmitting UE of the D2D pair; and b. A second CSI set (CQI, PMI, RI) referring to UL receive operation of the reference signals transmitted by eNB.

It should be further noted that at least the eNB should preferably provide a feedback on the CSI only for CQI and RI, with the assumption that no PMI will be provided by UE. A special control message may be used to indicate the assumption taken at receiver for the CSI feedback.

The MCS and rank selection process will preferably occur in three phases:

1. First phase, in which the D2D communication link is set;
2. Second phase, in which the information of the second CSI set is exchanged between UEs;
3. Third phase, in which the appropriate CSI is selected for the transmissions of each UE, such that both D2D and UE to eNB communications will operate in the same radio frame.

In case that the D2D communications are unidirectional, only one UE will take the decision regarding the used MCS and layer number, whereas its decision will still be based on the two CSI sets.

eNB and UE Functional Structure

Figure 5:
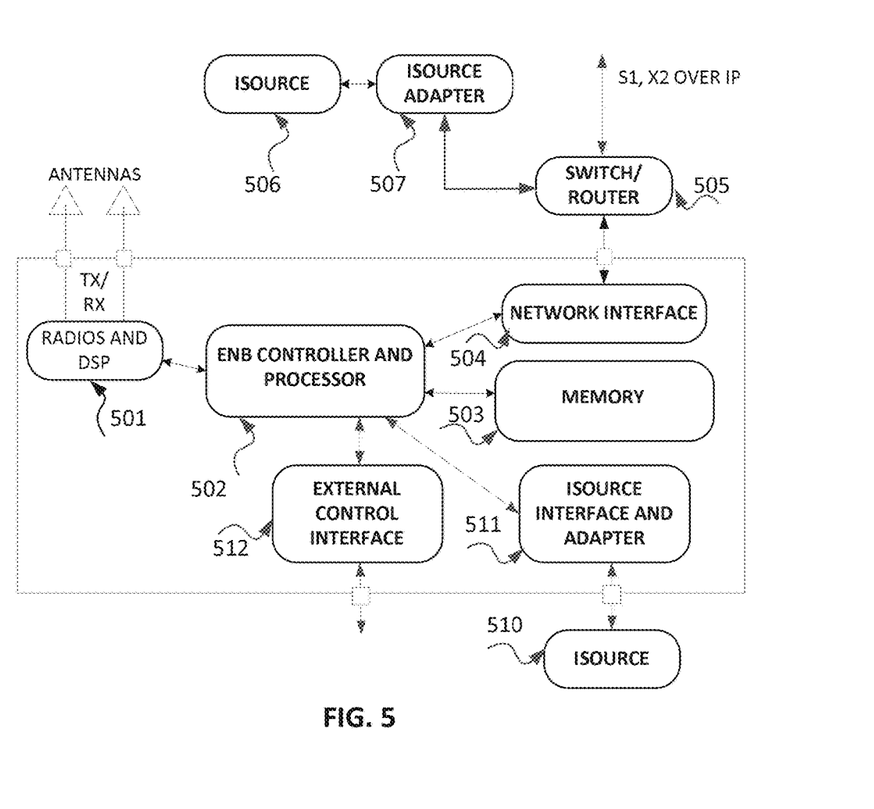
FIG. 5—Represents a base station block diagram.

The eNB structure is schematically illustrated in FIG. 5. The eNB typically comprises radios and DSPs-501, the eNB controller and processor-502, memory (RAM, flash) blocks-503, Network interfaces (504) and an external-505 or embedded Switch/Router.

Figure 6:
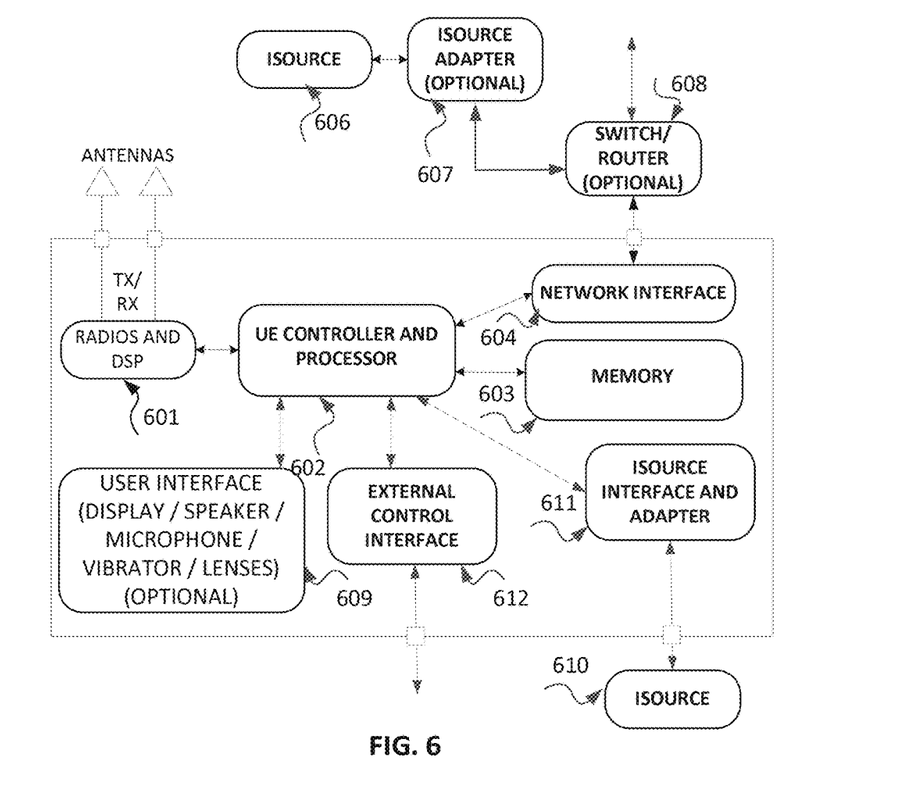
FIG. 6—Represents a UE block diagram.

The UE structure is schematically illustrated in FIG. 6. The UE typically comprises radios and DSPs-601, the UE controller and processor-602, memory (RAM, flash) blocks-603. The Network interfaces (604) and the user interfaces (609) are optional.

eNB can embed I/O modules specific to the Information Source-510, for example an interface card 511 or an interface chip (not shown in this figure). In case of low-latency video, the I/O will include for example a HDMI or a HDBaseT interface. The Interface Card or the interface chip may include an adapter block, with processing capabilities for data rate reduction.

The eNB illustrated in FIG. 5 or the UE illustrated in FIG. 6 can use an external box-507 or 607, respectively, which can include specific I/O interfaces (for example industrial interfaces, video interfaces) and some processing capabilities, for example A/D or D/A converters, digital or analog filters and amplifiers, image processing functions, etc.

Same functions as described above can be included in the internal modules 511 or 611, respectively.

The UE can process the data received from the ISource or can transfer it externally for processing. This is especially applicable when the data requires high computational capabilities.

A general interface for the eNB/UE can be Ethernet, with or without IP over it, which can aggregate on a single physical port (through a Router/Switch) multiple Information Sources.

Another interface widely used is USB.

In case of low-latency applications it may be needed to include a module for image data rate reduction or image restoration (Image Adaptor) within the UE and/or the eNB. Such module(s) may be located within the UE processor, including display interfaces, or may be located in a module 611 which is materialized in a form of FPGA or ASIC (Application Specific Integrated Circuit). Same approach may be needed also for the eNB.

The base station can also include information and processing functions that are specific for the respective ISource.

The eNB or UE can analyze inputs received from Isources (512, 612) and provide external commands to actuators, robots, etc., or to sound/voice generators, displays, etc.

Technologies

As will be appreciated by those skilled in the art, the terminology used throughout the specification is mainly that which is associated with LTE standards. However, it should be understood that embodiments of the present invention encompass other cellular standards, such as HSDPA and the like and both TDD and FDD duplexing modes.

The examples provided show certain ways of carrying out the invention. It is to be understood that invention is not intended to be limited to the examples disclosed herein. Rather, the invention extends to all functionally equivalent structures, methods and uses, as are within the scope of the claims.

The invention claimed is:

1. A method for providing road safety services in a cellular system, comprising:
   receiving video data from at least one video sensor, which captures video images of a road, in a base station or in a first user equipment (UE) or in an external processing block connected to the base station or to the first UE;
   establishing at least one of the following radio communication channels using a cellular technology: a first channel between at least one second user equipment (UE) and the base station and a second channel between at least one second UE and the first UE by using a device-to-device (D2D) cellular technology;
   connecting the second UE to an application for receiving at least one road safety information;
   identifying at least one video sensor capturing the image of at least one vehicle approaching the second UE;
   transmitting over the at least one radio communication channel to the at least one second UE, responsively to the identification of the at least one video sensor, at least one of the following road safety information: the video data representing the at least one vehicle in at least one area of at least one video image of the road in proximity to the second UE that was received from the at least one video sensor or control information resulting from processing the received video data and relating to a potential collision; and
   retrieving by the second UE at least one of the following road safety information: video data or control information, while using at least one descrambling code either received subsequently to the second UE connection to the road safety application or pre-configured for descrambling road safety information or a combination thereof.

2. The method according to claim 1, wherein the at least one video sensor or at least one control element connected to the second UE is identified by at least one member of a group that consists of: a cellular SIM, an Ethernet address or a product identification number.

3. The method according to claim 1, wherein transmitting the video data includes processing the at least one video image for adapting the transmitted data rate to at least one of the following: time-frequency resource or modulation and coding rate, assigned for transmission over the radio communication channel.

4. The method according to claim 1, wherein the at least one video data or the control information is used by a robot or by a control element embedded in a vehicle.

5. The method according to claim 1, wherein the at least one area of the video image is displayed on a user equipment located within a vehicle, and wherein the at least one video area being displayed of the at least one video image represents a current view of a road along which the vehicle is about to drive.

6. The method according to claim 1, wherein the control information is used in at least one of the following actions: activating an alert, controlling movement of the vehicle or sending a message or an alert to at least one third party.

7. The method according to claim 1, wherein a code representing the service providing road safety information is stored at a database together with information that allows identifying at least one radio cell through which road safety information may be delivered.

8. The method according to claim 7, wherein the database further includes location information of base stations or user equipments through which the road safety information may be delivered, for allowing a fast handover of the second UE to a different base station or user equipment through which the road safety information may be delivered.

9. The method according to claim 1, wherein the service providing road safety information is delivered by a specific network operator.

10. The method according to claim 1, wherein the radio communication channel includes carrier aggregation.

11. The method according to claim 1, wherein at least one carrier in an un-licensed or light licensed spectrum is utilized in the radio communication channel.

12. The method according to claim 1, and comprising providing to at least one mobile application running on the at least one second UE or to a control element mounted in a vehicle and connected to the second UE at least one of the following road safety information: the video data representing the at least one area of the at least one video image of the road or the control information or any combination thereof.

13. The method according to claim 1, wherein the video data is not compressed.

14. A user equipment (UE) apparatus for use in a cellular system supporting road safety services and comprising:
    a first interface, configured to receive video data from at least one video sensor which captures video images of a road or to receive control information from an external processing block connected to the at least one video sensor;
    a second interface, configured to establish a radio communication channel between said UE apparatus and at least one other user equipment (UE), by using a D2D cellular technology; and
    a processing block configured to transmit over the radio communication channel to the at least one other UE, subsequently to the said other UE connection with a road safety application and responsively to the identification of at least one video sensor capturing the image of the at least one vehicle approaching the said other UE, at least one road safety information so as to be retrieved by the other UE while using at least one descrambling code either transmitted by the UE apparatus subsequently to the other UE connection to the application or pre-configured for descrambling road safety information or a combination thereof, wherein the road safety information comprises at least one of the following: the video data representing at least one area of at least one video image of the road in proximity to the vehicle that was received from the at least one video sensor or control information relating to a potential collision and resulting from processing the video data by the said processing block comprised within the said apparatus or by the external processing block.

15. The communication apparatus of claim 14, wherein the processing block of the apparatus is further configured to process the at least one area of the at least one video image for adapting a rate at which data will be transmitted by the second interface, according to at least one of the following: time-frequency resource or modulation and coding rate, as assigned for transmitting the data over the radio communication channel.

16. A base station apparatus for use in a cellular system supporting road safety services and comprising:
    a first interface, configured to receive video data from at least one video sensor which captures video images of a road or to receive control information from an external processing block connected to the at least one video sensor;

a second interface, configured to establish a radio communication channel between said base station apparatus and at least one user equipment (UE) by using a cellular technology; and a processing block configured to transmit subsequently to the at least one UE connection with a road safety application and responsively to the identification of at least one video sensor capturing the image of the at least one vehicle approaching the at least one UE, at least one road safety information so as to be retrieved by the at least one UE while using at least one descrambling code either transmitted by the apparatus subsequently to the at least one UE connection to the application or pre-configured for descrambling road safety information or a combination thereof, wherein the road safety information comprises at least one of the following: the video data representing at least one area of at least one video image of the road in proximity to the vehicle that was received from the at least one video sensor or control information relating to a potential collision and resulting from processing the video data by the said processing block comprised within the said apparatus or by the external processing block.

17. A user equipment (UE) apparatus for use in a cellular system supporting road safety services and comprising:
a radio interface, configured to establish at least one of the following radio communication channels based on a cellular technology: a first channel between said UE and at least one base station and a second channel based on a device-to-device (D2D) cellular technology between said UE apparatus and at least one another user equipment (UE); and
a processing block configured to:
a) connect the UE apparatus to an application for receiving at least one road safety information;
b) retrieve the road safety information by using at least one descrambling code wherein the code was either transmitted by the base station subsequently to the UE connection to the road safety application or pre-configured for road safety use;
c) receive over the at least one first or second radio communication channel, responsively to the identification of at least one video sensor capturing the image of at least one vehicle approaching the said UE apparatus, at least one of the following road safety information: video data representing at least one area of at least one video image of a road in proximity to the vehicle or control information derived from processing the video data and relating to a potential collision.

18. A vehicle comprising the UE according to claim 17, and including a controller and at least one brake actuator or a driving robot, including at least one processor configured to analyze either the received video data representing the at least one area of the at least one video image or the received control information derived from processing the video image and configured to determine an action to be taken based on results of processing of one or more of the video data or control information.

19. The vehicle according to claim 18, wherein the action to be taken is a member of a group that consists of: reducing the speed of the vehicle, activating an audio alert, sending a message, sending an alert to a third party, or any combination thereof.

20. The communication apparatus according to claim 17, wherein the video data is not compressed.

21. The communication apparatus according to claim 17, wherein the processing block further includes the processing of the at least one area of the video image so as to detect a potential collision.

22. The communication apparatus according to claim 17, wherein the received video data representing the at least one area of the at least one video image or the received control information relating to the potential collision is provided to at least one mobile application running on the processor of the said apparatus so as to execute at least one action selected from a group that consists of:
(i) display a video image on the UE display;
(ii) activate an audio alert;
(iii) provide a command to at least one another apparatus.

* * * * *